HILL & HARPHAM.
Corn Harvester.
No. 70,335.
2 Sheets—Sheet 1.
Patented Oct. 29, 1867.
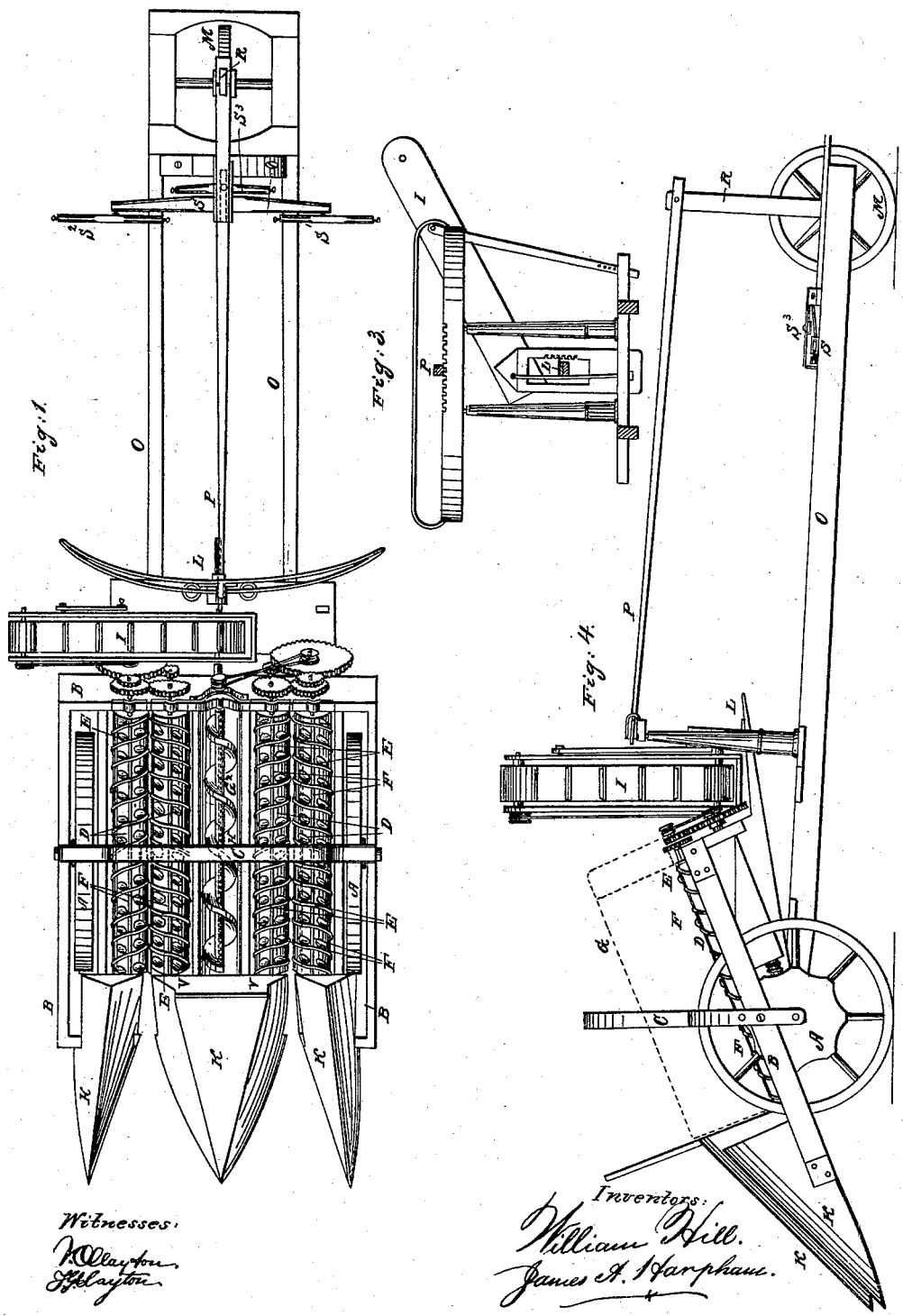

HILL & HARPHAM.
Corn Harvester.
No. 70,335.
2 Sheets—Sheet 2.
Patented Oct. 29, 1867.
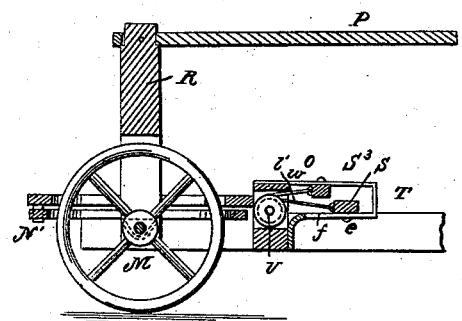
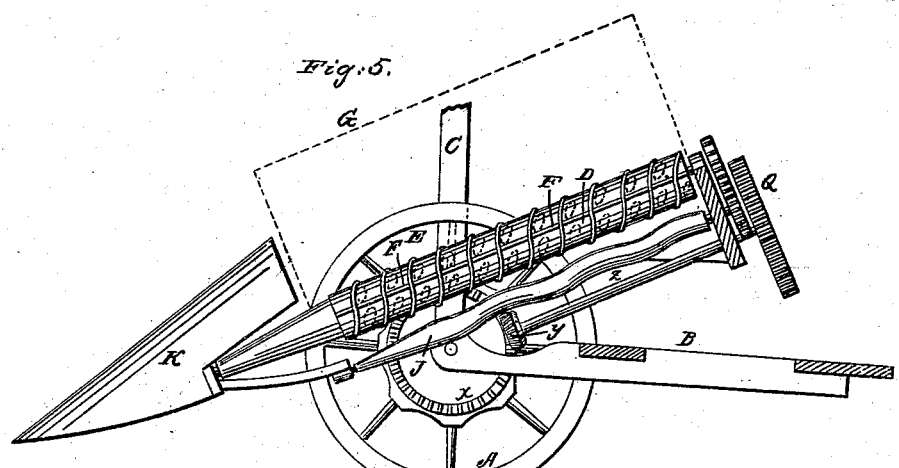
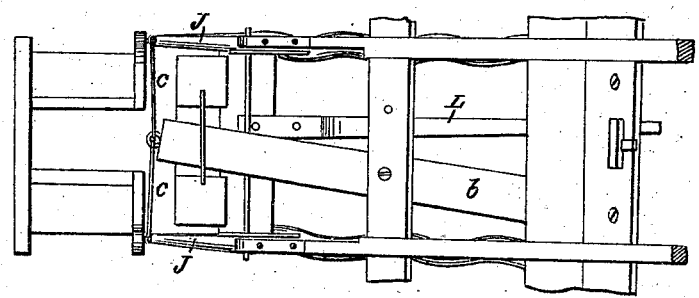

United States Patent Office.

WILLIAM HILL AND JAMES A. HARPHAM, OF HAVANA, ILLINOIS.

*Letters Patent No. 70,335, dated October 29, 1867.*

---

IMPROVEMENT IN CORN-HARVESTERS.

---

*The Schedule referred to in these Letters Patent and making part of the same.*

---

TO ALL WHOM IT MAY CONCERN:

Be it known that we, WILLIAM HILL and JAMES A. HARPHAM, of Havana, of Mason county, in the State of Illinois, have invented certain new and useful improvements in "Corn-Harvesters;" and we do hereby declare that the following is a full and exact description thereof; reference being had to the accompanying drawings, forming a part of this specification. In the drawings—

Figure 1 is a plan view.

Figure 2 is a sectional view, showing the "guide-wheel" and "triple-tree."

Figure 3 is a sectional view, showing the operation of the device for raising and lowering the frame carrying the cylinders.

Figure 4 is a side elevation, the "shields" being shown in dotted lines.

Figure 5 is a sectional side view, showing the relative position of the "cylinders" and "worm-rollers."

Figure 6 is a plan view of the bottom of a portion of the frame, showing the mode of separating the worm-rollers.

Our invention chiefly consists in arranging a series of cylinders provided with right and left-handed spiral flanges, and with knockers actuated by gearing, and borne through the field upon a suitable frame, so that the standing stalks may be drawn in between these cylinders, and the ears of corn be stripped from the stalks and delivered into a suitable receptacle, leaving the stalks standing in the field.

Also in arranging a series of worm-rollers beneath the cylinders, revolving in a direction opposite to the cylinders, for the purpose of grasping the stalks and pulling them down, so as to resist the tendency of the cylinders to pull upward.

Also in arranging an elevator between the two pair of cylinders, to receive the ears and deliver them into another elevator, which discharges them into a wagon or other receptacle.

Also in the improved construction of the "guide-wheel," by which we can very readily turn the machine as desired.

Also in the improved construction of the "triple-tree," for equalizing the draught upon the three horses which pull from the rear of the machine.

All of which, with other details, will more fully hereinafter appear.

The drawings are made on a scale of about half an inch to the foot.

In the drawings, A A represent the driving-wheels, upon which rests the whole weight of the front portion of the machine. These wheels are some five or six feet in diameter, and have a ribbed rim of sufficient width to avoid cutting in the ground. Suitable bevel-gear, $x$, (see fig. 5,) for driving the machinery is placed on the inside of each wheel A. Gear-wheels $x$ $x$ mesh with pinions $y$ $y$, and through shaft $z$ communicate motion to the series of cog-wheels Q which operate the cylinders and rollers, as is fully shown in figs. 1, 4, and 5.

B B represent the general frame of the machine, which supports the cylinders, rollers, gearing, &c.

C is an iron brace, of arch form, intended to prevent the spreading of the wooden frame B, and also to raise or lower the frame by means of the extra holes 1.

D D D D are the four gathering-cylinders, each about eight feet long and one foot in diameter, and having their ends revolving in boxes in opposite ends of frame B. The forward ends of these cylinders are conical, and are near enough to the ground to catch the lowest ears of the corn, while the rear ends are high enough to catch the highest ears. The cylinders are disposed in two parallel pairs, with a space for an elevator between the pairs.

E E are single-threaded right and left-handed spiral flanges, to be about three inches wide and one-fourth of an inch thick, and running around the cylinders. These flanges are designed to pass the stalks relatively backward as fast as they are taken in at the front of the machine, thus preventing the clogging or breaking of the stalks, and unnecessary friction; thus passing the stalks back until the ears receive an upward stroke from the "knockers" F F, which shoots them off the stalk, with or without a part or the whole of the husk. These flanges run opposite and close to each other, so that no stalk can pass from the space it occupies only by the revolution of the cylinder.

F F are "knockers," running lengthwise of the cylinders, and are arranged so close that as they strike up against the side of the stalk no ear will escape a stroke, or be drawn through between the cylinders, or be caught between the knockers and mashed. These knockers should be about two and three-eighths inches wide, filling up the space between the flanges within about five-eighths of an inch. The knockers on the pair of cylinders run uniformly opposite each other, and both strike the ear at the same time on opposite sides, giving the ear a double knock on both sides of the husks at the butt of the ear. There is a space of about one and one-fourth inch between the knockers of the cylinders, while the flanges are close together, so that no stalk can pass from one space into another except by the revolving of the cylinders. The cylinders revolve relatively outward so as to knock the ears upward.

The outer cylinders should be provided with shields G G, (shown by dotted lines in figs. 4 and 5,) placed near enough to the flanges so as to throw the ears as they are knocked off over upon the inside cylinder, and thence into the elevator placed between the two series of cylinders. We may also use a similar central shield, $G^2$, (dotted lines in fig. 1,) to prevent the ears passing from side to side and wasting.

H is an "elevator," placed between each pair of cylinders, and is intended to receive the ears from the cylinders and elevate them into the discharge-elevator. The drawing shows a screw-elevator. Instead of this we may use an endless apron provided with slats. The elevator H is driven by a belt from the shaft of the main cog-wheel.

I is a reversible discharge-elevator, at right angles with the elevator H, and at the rear of the machine. The ears are carried from elevator H into elevator I, (see fig. 1,) and thence discharged into a wagon at the side of the machine, or into any other suitable receptacle.

J J J J are two series of "worm-rollers," arranged and driven like the cylinders D D, but placed beneath them, and revolving in the opposite direction, so as to seize hold of the stalks and give them a downward pull, so as to counteract the upward pull of the cylinders, thus allowing the stalks to remain standing in the field. There is not at all times need of this device, for most of the stalks are tight enough set in the ground to resist the upward pull of the cylinders. Whenever the operator notices that any of the stalks appear to be loose, he puts his foot upon the treadle b, which, by means of short levers c c, makes the rollers J J approach each other, so as to grasp and pull down the stalks.

K K K are the pointed "gatherers," placed in the front end of the machine, so as to lift up the down stalks, and to direct the stalks into the grasp of the cylinders and rollers. Instead of stationary bevelled gatherers K, we may use inclined revolving cylinders, properly geared and arranged.

By means of lever L, the operator may easily raise or lower the front end of the machine.

It will be noticed that the reversible elevator I, can be reversed so as to discharge at either the right or left side of the machine, simply by turning it over and adjusting the brace d.

M is the guide-wheel, some three feet in diameter, so as to turn easily on soft ground, and has its bearings in the horizontal rim-wheel N, which plays on friction-roller bearings on the rear end of the shafts O O, as seen in figs. 1, 2, and 4.

A guide-lever, P, is connected by lever R to the wheel M, and extends forward so that the operator standing at the rear of the frame B can readily guide the machine.

S $S^1$ $S^2$ $S^3$ represent what we term the equalizing "triple-tree," and is intended to equalize the draught on the three horses.

S is the stout double-tree, to the ends of which the single-trees $S^1$ $S^2$ for the outside horses are pivoted. A pin, e, projects downward from the centre of double-tree, and plays in slot f in the hold-back T, so as to allow the double-tree to give back and forth, and not get away from its position.

A stout cord, i, is fastened at one end to the centre of double-tree S, while the other end is secured to the smaller periphery of the double pulley U, which has its bearings a little to the rear of the double-tree.

$S^3$ is the single-tree, to which the central horse is hitched. A pin, o, projects upwards from the centre-tree $S^3$, and plays in slot s in the upper part of the hold-back T, so as to permit the tree $S^3$ to move equally and similarly to the double-tree S. A cord, u, has one end fast to the centre of the tree $S^3$, and its other end to the larger periphery of the double pulley U. By this simple construction it will be seen that the point of draught is at the axle of the double pulley U, and that there can be no "dead-draught," each horse doing his share, and all drawing from a common centre.

V V are small springs, set into the frame, and against the front ends of the cylinders D D D D, so as to allow some lateral yield when an extra large or strong stalk enters the machine.

Having thus fully described our invention, what we claim as new, and desire to secure by Letters Patent, is—

1. The cylinders D, constructed and operating substantially as described, with the flanges E and knockers F.

2. The elevator H, in combination with the cylinders D, substantially as described.

3. The elevator H, in combination with the discharge-elevator I, substantially as described.

4. The reversible elevator I, constructed and operating substantially as described, so as to discharge the corn on either side.

5. The "triple-tree" S $S^1$ $S^2$ $S^3$, in combination with double pulley U, and cords i and u, substantially as described.

WILLIAM HILL,
JAS. A. HARPHAM.

Witnesses:
   JAMES H. HOLE,
   E. B. HARPHAM.